United States Patent [19]

Usher et al.

[11] Patent Number: 4,463,959
[45] Date of Patent: Aug. 7, 1984

[54] COMPOSITE GASKET INCLUDING RINGS OF REFRACTORY SHEET MATERIAL AND KNITTED WIRE MESH

[75] Inventors: Peter P. Usher, Union; Eugene J. Gavaletz, Toms River, both of N.J.

[73] Assignee: Metex Corporation, Edison, N.J.

[21] Appl. No.: 477,173

[22] Filed: Mar. 21, 1983

[51] Int. Cl.³ .................. F16J 15/12; B32B 31/06
[52] U.S. Cl. .................. 277/230; 277/1;
  277/30; 277/105; 277/235 R; 277/DIG. 6;
  29/520; 264/258; 264/324; 264/501; 264/512;
  285/368; 285/412; 285/DIG. 18
[58] Field of Search .............. 277/1, 12, 30, 47, 48,
  277/101, 102, 105, 106, 204, 229, 230, 233, 234,
  235 R, 235 A, 235 B, 236, DIG. 6; 29/520;
  285/187, 363, 368, 405, 412, DIG. 11, DIG. 18;
  264/103, 248, 257, 258, 268, 273, 324, 501, 502,
  512, 516, 563

[56] References Cited

U.S. PATENT DOCUMENTS

| | | | |
|---|---|---|---|
| 2,676,823 | 4/1954 | Olson et al. | 264/324 X |
| 2,924,471 | 2/1960 | Poltorak et al. | 277/230 X |
| 3,044,922 | 7/1962 | Kappel | 264/324 X |
| 3,361,432 | 1/1968 | Usher | 277/203 |
| 3,404,061 | 10/1968 | Shave et al. | 264/324 X |
| 4,097,071 | 6/1978 | Crawford et al. | 285/94 |
| 4,209,177 | 6/1980 | Hall | 277/101 |
| 4,234,638 | 11/1980 | Yamazoe et al. | 277/DIG. 6 |

FOREIGN PATENT DOCUMENTS

| | | | |
|---|---|---|---|
| 6127 | 1/1980 | European Pat. Off. | |
| 2829333 | 5/1979 | Fed. Rep. of Germany | 277/106 |
| 2912347 | 10/1980 | Fed. Rep. of Germany | 285/DIG. 11 |
| 972650 | 10/1964 | United Kingdom | 264/324 X |
| 1113320 | 5/1968 | United Kingdom | 264/324 X |
| 2087023 | 5/1982 | United Kingdom | |
| 2098808 | 11/1982 | United Kingdom | |

Primary Examiner—Robert S. Ward

[57] ABSTRACT

A composite gasket includes two spaced rings of refractory sheet material and a ring of knitted wire mesh. The knitted wire mesh extends into the space between the refractory rings and radially outward from the outside diameter of the refractory rings.

7 Claims, 6 Drawing Figures

FIG. 4.
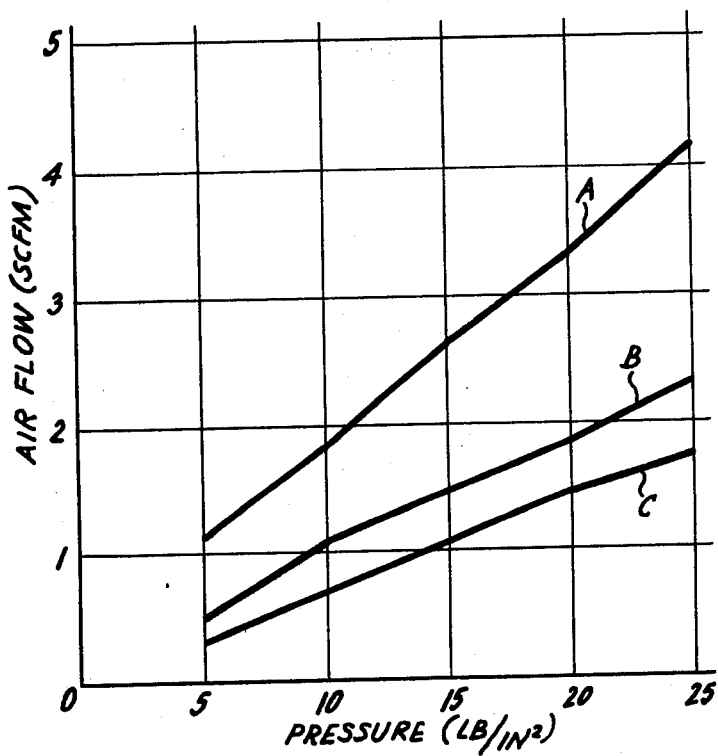
FIG. 5.
FIG. 6.
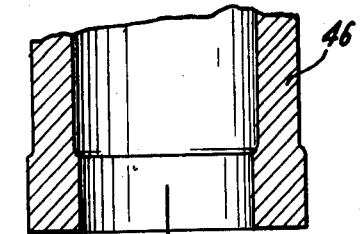
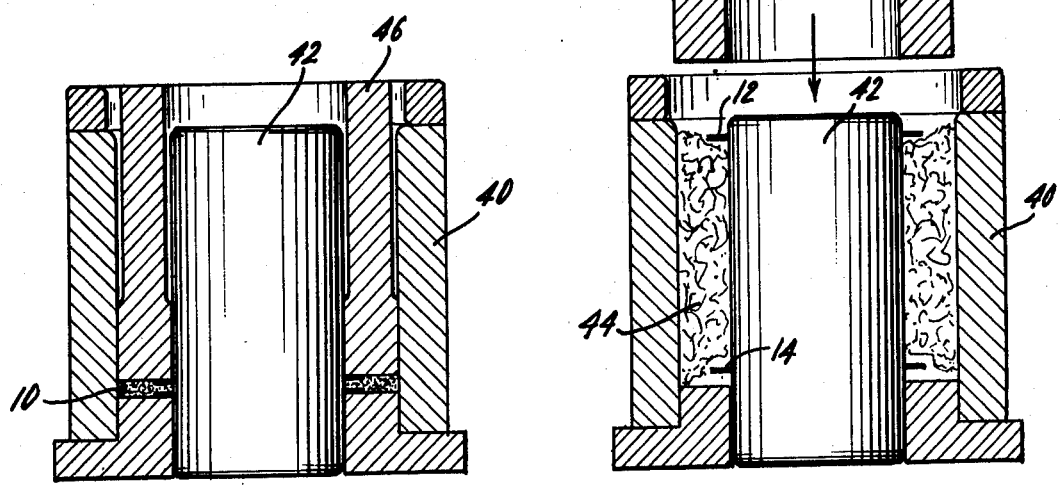

COMPOSITE GASKET INCLUDING RINGS OF REFRACTORY SHEET MATERIAL AND KNITTED WIRE MESH

DESCRIPTION OF THE INVENTION

This invention relates to gaskets and more paritcularly to a composite gasket for use in sealing gas passages particularly in automobile exhaust systems.

Automobile exhaust pipes are often joined together by means of two flat flanges, with a gasket between the flanges and two bolts which secure the flanges and gasket together and seal the passage between the flanges against the leakage of gas. The gasket is intended to prevent exhaust gas from leaking through the joint while, at the same time, resist deterioration from the high temperature and the corrosive action of the gas. Furthermore, it must by sufficiently resilient and compliant to withstand repetitive thermal cycling through sub-freezing winter temperatures up to operating temperatures in excess of 1200 degrees Farenheit. Without such resilient compliance, a gasket would develop leakage paths and would soon be destroyed by the corrosive action of the hot exhaust gas.

In response to a specific leakage problem in flanged exhaust pipe joints for exhaust systems of automobiles, an exhaust seal was developed using compressed knitted wire mesh. The knitted wire mesh was formed into a cylindrical perform and compressed in a compression die to form the gasket. While this construction gave satisfactory performance, it produced a gasket which was slightly porous and permitted leakage of some of the exhaust gas through the gasket.

Accordingly, it is an object of this invention to provide an improved gasket particularly for use in the exhaust system of an internal combustion engine which improves upon the prior exhaust gaskets and particularly improves upon the prior compressed knitted wire mesh gasket.

It is a further object of the invention to provide a gasket having increased density in the central portion of the gasket making it more leak resistent in this region.

It is a more specific object of the invention to provide a gasket in which rings made from refractory material are mechanically imbedded into a knitted wire mesh structure by compressive stresses during a press forming operation.

It is a still further and specific object of the invention to provide a gasket which is formed with relatively little radial movement of the refractory rings during press forming and in which the refractory rings are embedded into the mesh structure without tearing or displacing the rings in a radial direction.

It is another object of the invention to provide a gasket having a smooth surface in at least one region to enhance the sealing action of the gasket when it is clamped between two flanges.

It is another object of the invention to provide a gasket which has at least one region of relatively lower density and high residual resiliency to provide mechanical and thermal compliance when put into service and a second region of relatively high density and greater rigidity to provide leak resistance. More specifically, it is an object of the invention to provide a composite gasket formed from refractory rings and knitted wire mesh in which the outer diameter of the refractory rings are less than the outer diameter of the knitted wire mesh so that an outer radial portion of the composite gasket is at a lower density than an inner radial portion whereby the outer radial portion serves to radially support the composite gasket because of the tendency for bare wires in the outer radial portion to provide greater frictional resistance to radial movement between the metallic flange surfaces of the joint assembly into which the gasket is installed while the inner radial portion provides an effective seal because of its increased density thereby providing a gasket with improved performance characteristics.

In accordance with a specific embodiment of the invention, a composite gasket for sealing an opening between confronting pipes in the exhaust gas passage of an an automobile engine comprises a first ring of refractory sheet material, a second ring of refractory sheet material spaced from the first ring, and a ring of knitted wire mesh extending into the space between the refractory rings and firmly interlocking with the first and second rings of refractory sheet material. Preferably, the outside diameters of the first and second rings of refractory sheet material are the same and less than the outside diameter of the knitted wire mesh so that the composite gasket has a relatively less dense outer radial portion including only knitted wire mesh and a relatively denser inner radial portion including knitted wire mesh between two spaced rings of refractory sheet material.

The invention also includes the method of forming the composite gasket which comprises the steps of forming a preform by positioning a first ring of refractory sheet material in a compression die, positioning a sleeve of knitted wire mesh on top of the ring of refractory sheet material and positioning a second ring of refractory sheet material on top of the knitted wire mesh sleeve to create a perform. Axial compression is applied to the preform to compress the preform to the desired thickness of the finished composite gasket and to firmly interlock the refractory material with the knitted wire mesh.

These and other objects and features of the invention will be more readily understood when taken in conjunction with the following detailed description of the invention and the following drawings, of which:

FIG. 4 is a graph showing the results of tests of air flow leakage from an exhaust gas passage as a function of the pressure in the passage comparing gas leakage using a gasket constructed solely of knitted wire mesh construction and composite gaskets constructed in accordance with this invention and demonstrating the improvement obtained by use of the composite gasket of this invention;

FIGS. 5 and 6 are diagrammatic representations showing the manner in which the composite gasket of the invention is formed in accordance with the invention.

Figure 1:
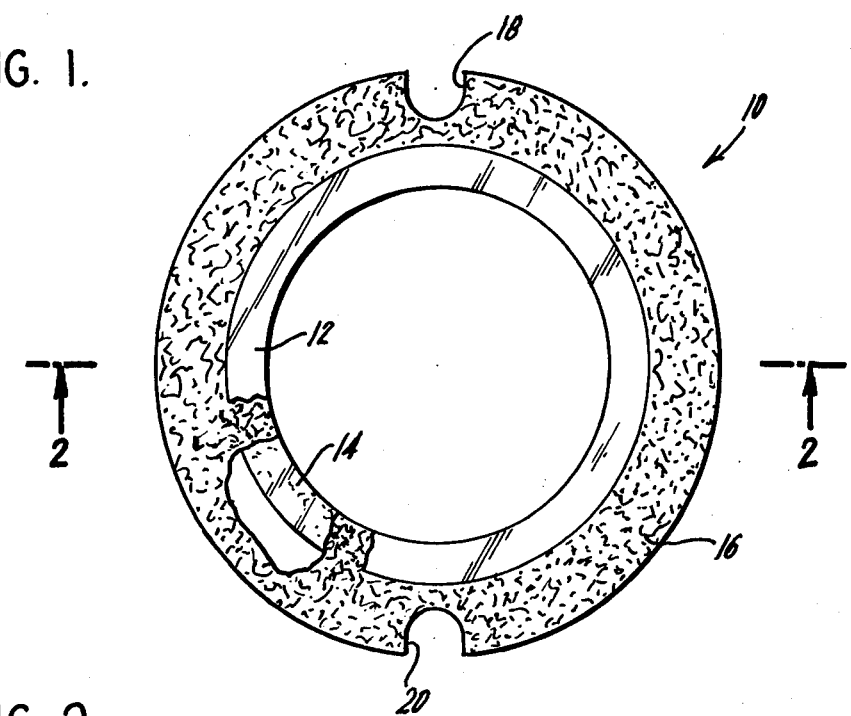
FIG. 1 is a top plane view of a composite gasket of the invention partially broken away to show both rings of refractory sheet material and the knitted wire mesh extending between the rings.
Figure 2:
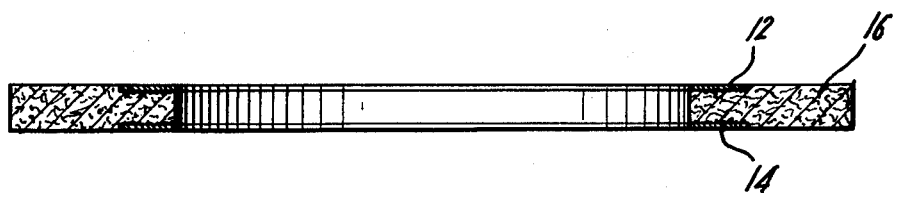
FIG. 2 is a sectional view taken along line 2—2 of FIG. 1 and looking in the direction of the arrows.

Referring now to FIGS. 1 and 2, the composite gasket 10 comprises first or top ring 12 of refractory sheet material such as silicone bonded mica paper, for example, #22-05-25, manufactured by Midwest Mica and Insulation Company of Cleveland, Ohio, or flexible sheet graphite sold under the trademark, GRAFOIL, manufactured by Union Carbide Corporation of Danbury, Conn., and a second or lower ring 14 of refractory sheet material. A ring of compressed knitted wire mesh 16 extends into the space between the first ring 12 and second ring 14 and extends radially outward of the outside diameter of rings 12 and 14. Bolt receiving cutouts 18, 20 are formed in the knitted wire mesh 16. In a typical construction, each ring of refractory material 12, 14 measures 2.8 inches outside diameter and 2.3 inches inside diameter and 0.015 inches thick. The ring of knitted wire mesh 16 is approximately 3.75 inches outside diameter and 2.3 inches inside diameter the same inside diameter as the inside diameter of the rings of refractory material 12, 14. The thickness of the seal is approximately 0.060 inches. These dimensions are chosen for particular application for the seal and can be changed as necessary in order to adjust the dimensions of the composite gasket to particular installations.

The composite gasket thus has an inner radial portion and an outer radial portion, the inner radial portion being radially coextensive with the rings of refractory sheet material which includes the rings of refractory sheet material 12, 14 and the portion of the knitted wire mesh 16 between rings 12 and 14 to provide to give that inner portion greater resistance to gas leakage and enhance the sealing action of the composite gasket when it is clamped between two flanges.

The outer radial portion of the composite gasket which includes the portion of the knitted wire mesh 16 radially outward of the rings of refractory material 12 and 14 is relatively less dense than the inner radial portion of the composite gasket. Since 100% density is never reached in the mesh structure in the outer radial portion there is corresponding residual resiliency and mechanical and thermal compliance in the composite gasket in that region when it is put into service and contact between the knitted wire mesh and flange surfaces provide greater frictional resistance to radial movement of the composite gasket. Thus, the composite gasket consists of an inner radial portion having a structure composed of refractory material and knitted wire mesh which provides a relatively smooth outer surface and relatively dense structure and an outer radial portion having only knitted wire mesh which is relatively less dense and resilient and mechanically and thermally compliant. Preferably, the inner radial portion is approximately 40% of the width of the entire composite gasket.

Figure 3:
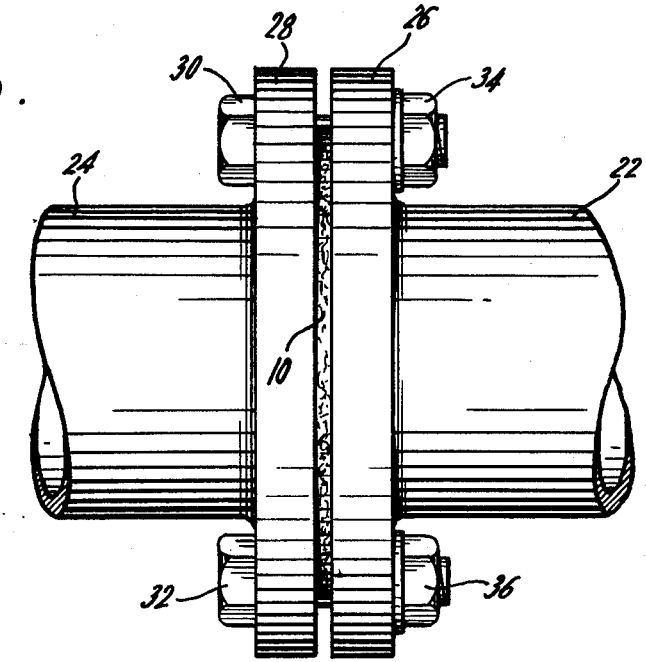
FIG. 3 shows a typical installation for the composite gasket between the two flanges of an exhause pipe to seal the exhaust gas passage of an automobile engine.

FIG. 3 shows the composite gasket 10 installed for a typical use in the exhaust gas passage of an automobile to seal the joint between two confronting exhaust pipes 22, 24. As shown, exhaust pipes 22, 24 terminate respectively in laterally extending flanges 26, 28 having provision for clamping together by bolts 30, 32, which extend through holes (not shown) in flanges 26, 28, and nuts 34, 36. The inner diameter of seal 10 is selected to be equal to the inside diameter of exhaust pipes 22, 24 and the bolt receiving holes 18, 20 are positioned so that bolts 30, 32 pass through holes 18, 20.

The outer radial portion of the gasket which extends radially past the outside of refractory rings 12 and 14 has a lower density than the inner radial portion to provide resiliency which enhances the performance characteristics of the composite gasket. Furthermore, the outer radial portion serves to radially support the entire gasket because of the tendency of the bare wires in the outer radial portion to provide greater frictional resistance of radial movement than the relatively smooth inner radial portion whose surfaces comprise the refractory sheet material.

Typically, knitted wire mesh 16 is made of round wire and various diameters and materials can be used. However, it is preferred that 0.0045 inch diameter flattened wire be used although both smaller and larger diameters can be used. The density of the mesh is preferably approximately 43%. However, densities above and below the preferred density can be used to achieve varying resiliencies and sealing effect. Gasket thickness both above and below the preferred 0.060 inch thickness can be fabricated in accordance with the principles of this invention and the particular installation requirements. Furthermore, the gasket can be formed into shapes other than an annular ring and, of course, can be used in applications other than in the exhaust gas passage of an automobile engine.

In embodiments of the invention which are not annular rings, it will be understood that the invention includes an inner relatively dense portion and an outer relatively less dense portion without reference to the two portions being radial with respect to each other.

FIG. 4 shows a graph of the leakage of exhaust gas from an exhaust gas passage as a function of pressure for different gasket constructions and demonstrates the superiority of the composite gasket of the invention. The line marked "A" in FIG. 4 are the results of a test on a gasket made solely of compressed knitted wire mesh. The line marked "B" in FIG. 4 are the results of a test on a composite gasket, such as shown in FIG. 1, with the refractory rings 12, 14 being formed of GRAFOIL. The line marked "C" in FIG. 4 are the results of a test using a composite gasket such as shown in FIG. 1 with the refractory rings 12, 14 being mica. As is apparent from this graph of FIG. 4, a significant improvement in leakage rate is effected between the gaskets "B" and "C" constructed in accordance with the invention and having the configuration shown in FIG. 1 and the gasket "A" constructed solely of knitted wire mesh. There are also differences, as shown in FIG. 4, between the composite gaskets utilizing mica paper rings and GRAFOIL rings. However, those differences are relatively insignificant when compared with the differences between the composite gasket of the invention and the gasket made solely of compressed knitted wire mesh.

FIGS. 5 and 6 shown diagrammatically how the composite gasket is formed. Referring to FIG. 5, a precut refractory ring 14 is first placed in a compression die 40 over a die pin 42. Next, a knitted wire mesh sleeve 44 is slipped into the die cavity and over die pin 42. Next, a second refractory ring 12 of the same dimensions as the ring 14, is positioned over the die pin 42 and on top of mesh sleeve 44. Thus a preform of refractory ring 14, knitted wire mesh sleeve 44 and refractory ring 12 is formed. Finally, a die punch is introduced into the die cavity and pressed downward with approximately 75 tons of force to form the finished gasket 10 (FIG. 6). Two bolt holes 18, 20 are cut in the gasket in a separate stamping operation. During the pressing operation, the density of the knitted wire mesh sleeve 44 increases until the final gasket thickness is reached. In the outer radial portion of the composite gasket 10, the knitted wire mesh achieves the preferred minimum density of 43% while whin the inner radial portion of the composite gasket 10, the density of the gasket will be higher.

The density of the inner radial portion will depend on the thickness and density of the refractory rings 12, 14.

It should be understood that other materials aside from mica paper and GRAFOIL could be used for the rings in the inner radial portion of the composite gasket, the particular material depending upon the sealing requirements for the particular composite gasket. These rings generally would be made from flexible refractory material of paper-like consistency.

What is claimed is:

1. A composite gasket of predetermined thickness having an upper and lower surface, said composite gasket having a relatively dense portion including a relatively thin sheet of refractory material proximate the upper and lower surfaces separated by a layer of knitted wire mesh, a relatively less dense portion including only knitted wire mesh.

2. A composite gasket having two sealing regions, the first region having relatively low density and the second region having a relatively higher density, said first region being formed of compressed knitted wire mesh and said second region being formed of a layer of knitted wire mesh between two layers of refractory sheet material.

3. A composite gasket comprising
a first ring of refractory material having a preselected inner and outer diameter,
a second ring of refractory material spaced from said first ring of refractory material and having a preselected inner and outer diameter,
a ring of knitted wire mesh having a preselected inner and outer diameter, a portion of said knitted wire mesh extending into the space between said first and second rings of refractory material, the diameter of said knitted wire mesh being selected so that the knitted wire mesh extends radially outward from the outer diameter of said refractory material thereby forming a composite gasket having a first region including the rings of refractory material and knitted wire mesh therebetween having a relatively higher density and a second region consisting of the knitted wire mesh having a relatively low density to provide improved sealing against leakage of gas.

4. The composite gasket of claim 3 wherein the refractory material is flexible sheet graphite.

5. The composite gasket of claim 3 wherein the refractory material is mica paper.

6. A method for forming a composite gasket comprising the steps of forming a preform by:
inserting a first layer of refractory material into a compression die,
inserting a sleeve of knitted wire mesh into the compression die and overlaying the first ring of refractory material,
inserting a second ring of refractory material into the compression die on top of said knitted wire mesh sleeve,
compressing the preform with sufficient force so that the knitted wire mesh is compressed and becomes firmly interlocked with the refractory material to form the composite gasket.

7. The method of forming the composite gasket according to claim 6 wherein the first and second layers of refractory materials are rings of refractory material having preselected inside and outside diameters and the sleeve of knitted wire mesh has a preselected inside and outside diameter, the outside diameter of the knitted wire mesh being greater than the outside diameter of the refractory material.

* * * * *